US012746979B2

(12) United States Patent
Tsuboi et al.

(10) Patent No.: US 12,746,979 B2
(45) Date of Patent: Sep. 29, 2026

(54) REAR STRUCTURE OF VEHICLE

(71) Applicant: Honda Motor Co., Ltd., Tokyo (JP)

(72) Inventors: Wataru Tsuboi, Tokyo (JP); Hirotaka Hayakawa, Tokyo (JP); Shinjiro Yoshida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 317 days.

(21) Appl. No.: 18/420,739

(22) Filed: Jan. 23, 2024

(65) Prior Publication Data

US 2024/0351639 A1 Oct. 24, 2024

(30) Foreign Application Priority Data

Apr. 19, 2023 (CN) ........................ 202310417339.0

(51) Int. Cl.
*B62D 25/16* (2006.01)
*B62D 25/20* (2006.01)

(52) U.S. Cl.
CPC ......... *B62D 25/16* (2013.01); *B62D 25/2027* (2013.01)

(58) Field of Classification Search
CPC .. B62D 25/16; B62D 25/163; B62D 25/2027; B62D 25/2036
USPC .......................... 296/187.01, 187.11, 193.08
See application file for complete search history.

(56) References Cited

U.S. PATENT DOCUMENTS

| | | | | |
|---|---|---|---|---|
| 12,420,868 | B2 * | 9/2025 | Akaba | B62D 21/11 |
| 2014/0070566 | A1 * | 3/2014 | Ogawa | B62D 25/087 296/187.11 |
| 2023/0373563 | A1 * | 11/2023 | Rai | B62D 21/152 |
| 2024/0317318 | A1 * | 9/2024 | Mikami | B62D 25/088 |
| 2025/0121890 | A1 * | 4/2025 | Zhang | B62D 25/087 |

FOREIGN PATENT DOCUMENTS

| | | |
|---|---|---|
| JP | 2013203237 | 10/2013 |

* cited by examiner

*Primary Examiner* — Jason S Daniels
(74) *Attorney, Agent, or Firm* — JCIPRNET

(57) ABSTRACT

A rear structure of vehicle includes: a rear wheel cover; a rear side vehicle frame, provided on a lower side in a vehicle up and down direction of the rear wheel cover, a rear side inner panel, provided on an outer side in a vehicle-width-direction of the rear wheel cover; and an outrigger, extending from the rear side vehicle frame toward the outer side in the vehicle-width-direction and joining with a rear side lower end portion of the rear wheel cover. The outrigger is joined with the rear side inner panel in a vehicle front and rear direction.

8 Claims, 4 Drawing Sheets

REAR STRUCTURE OF VEHICLE

CROSS-REFERENCE TO RELATED APPLICATION

This application claims the priority benefit of China application serial no. 202310417339.0, filed on Apr. 19, 2023. The entirety of the above-mentioned patent application is hereby incorporated by reference herein and made a part of this specification.

BACKGROUND

Technical Field

The disclosure relates to a rear structure of vehicle.

Description of Related Art

In order to provide a sustainable transportation system for the elderly, the physically challenged, and children, a transportation system with better rigidity of the vehicle body has been developed. In the existing technology, although a rear side inner panel is mounted on the outer side of the wheel cover to prevent twisting, the upper portion of the rear side inner panel falls down to the inner side due to inertia when the vehicle turns, which increases the load of the wheel cover mounted on the lower portion of the rear side inner panel. The disclosure aims to solve the above problem by improving the rigidity of the vehicle body, and further aims to provide a sustainable transportation system.

SUMMARY

The disclosure is related to a rear structure of vehicle that is capable of preventing components from being separated due to inertia.

The rear structure of vehicle of the disclosure includes: a rear wheel cover; a rear side vehicle frame, provided on a lower side in a vehicle up and down direction of the rear wheel cover; a rear side inner panel, provided on an outer side in a vehicle-width-direction of the rear wheel cover; and an outrigger, extending from the rear side vehicle frame toward the outer side in the vehicle-width-direction and joining with a rear side lower end portion of the rear wheel cover. The outrigger is joined with the rear side inner panel in a vehicle front and rear direction.

Based on the above, in the rear structure of vehicle of the disclosure, the outrigger and the rear side inner panel are joined in the vehicle front and rear direction. Thus, when the rear portion of the vehicle body twists, the lower portion of the rear side inner panel may be suppressed from expanding toward the outer side, thereby suppressing the twisting of the vehicle body. In other words, joining in a direction orthogonal to the expansion direction (i.e., shearing direction) may ensure the joint strength of the rear side inner panel and the outrigger, and may also suppress the twisting of the vehicle body by suppressing the separation of the rear side inner panel. Accordingly, the rear structure of vehicle of the disclosure is capable of preventing components from being separated due to inertia.

In order to make the above-mentioned features and advantages of the disclosure comprehensible, embodiments accompanied with drawings are described in detail below.

DESCRIPTION OF THE EMBODIMENTS

Figure 1:
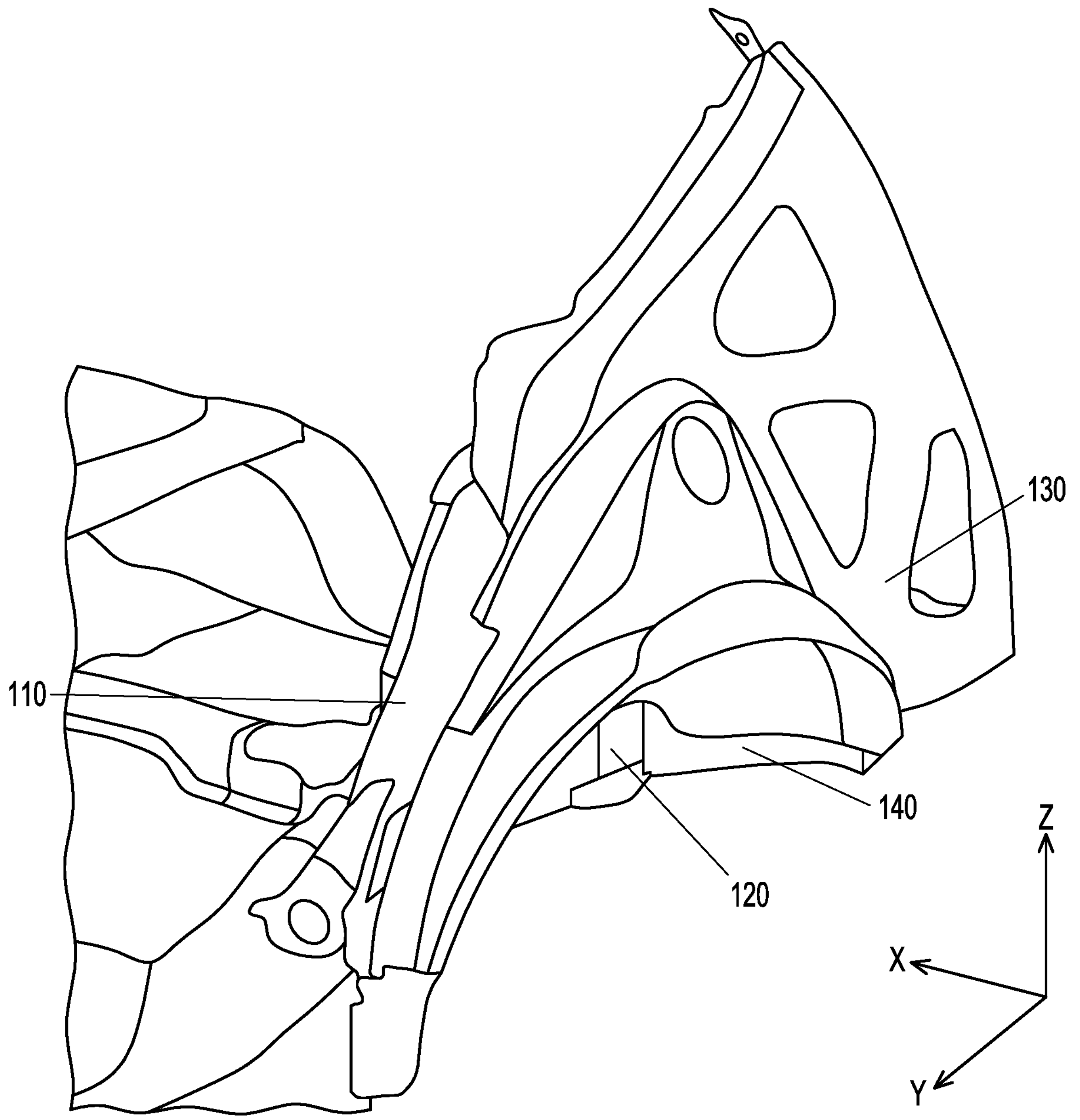
FIG. 1 is a perspective schematic view of the rear structure of vehicle according to one embodiment of the disclosure.

In one embodiment of the disclosure, the outrigger includes a side wall, and the side wall is provided on a lower side in the vehicle up and down direction of the rear wheel cover, the side wall includes a body portion and an extension portion, the body portion is joined with the rear wheel cover, the extension portion extends from the body portion toward the outer side in the vehicle-width-direction, and the extension portion is joined with the rear side inner panel in the vehicle front and rear direction.

In one embodiment of the disclosure, floor base plate side portions are provided on a rear side in the vehicle front and rear direction of the rear wheel cover and on the outer side in the vehicle-width-direction of the rear side vehicle frame, the body portion of the side wall is clamped and joined by the rear wheel cover and the floor base plate side portions, and the extension portion extends in the vehicle-width-direction to the outer side than the floor base plate side portions and is joined with the rear side inner panel.

In one embodiment of the disclosure, a lower end edge of the body portion of the side wall gradually tilts toward an upper side in the vehicle up and down direction as extending toward the outer side in the vehicle-width-direction, and a space is formed between the lower end edge and the extension portion in the vehicle-width-direction.

In one embodiment of the disclosure, the outrigger further includes a lower wall, and the lower wall extends from a lower end edge of the side wall toward the vehicle front and rear direction, and a width of the lower wall in the vehicle front and rear direction is tapered as extending toward the outer side in the vehicle-width-direction.

In one embodiment of the disclosure, the rear side vehicle frame includes protruding portions, and a portion of the protruding portions are provided at a position further rearward than the side wall of the outrigger in the vehicle front and rear direction, and another portion is provided at a position overlapping the lower wall of the outrigger in the vehicle-width-direction.

In one embodiment of the disclosure, the rear wheel cover includes: an inner wall, provided on an inner side in the vehicle-width-direction; a rear wall, provided on a rear side in the vehicle front and rear direction; and a ridge line portion, provided between the inner wall and the rear wall. The outrigger further includes a connecting portion, and the connecting portion is provided on an inner side end portion in the vehicle-width-direction of the side wall and joined with the ridge line portion.

In one embodiment of the disclosure, the outrigger further includes: a flange portion, extending from an inner side end portion in the vehicle-width-direction of the side wall toward a front side in the vehicle front and rear direction, and is joined with the rear side vehicle frame; and a guiding ridge, provided between the flange portion and the side wall.

In one embodiment of the disclosure, the rear structure of vehicle further includes: a floor beam member, provided between a pair of the rear side vehicle frames. A lower surface of the rear side vehicle frame is provided with a sub vehicle frame fixing portion, the outrigger is provided in parallel with the floor beam member in the vehicle-width-direction, and the outrigger is provided at a position further rearward than the sub vehicle frame fixing portion in the vehicle front and rear direction.

Figure 2A:
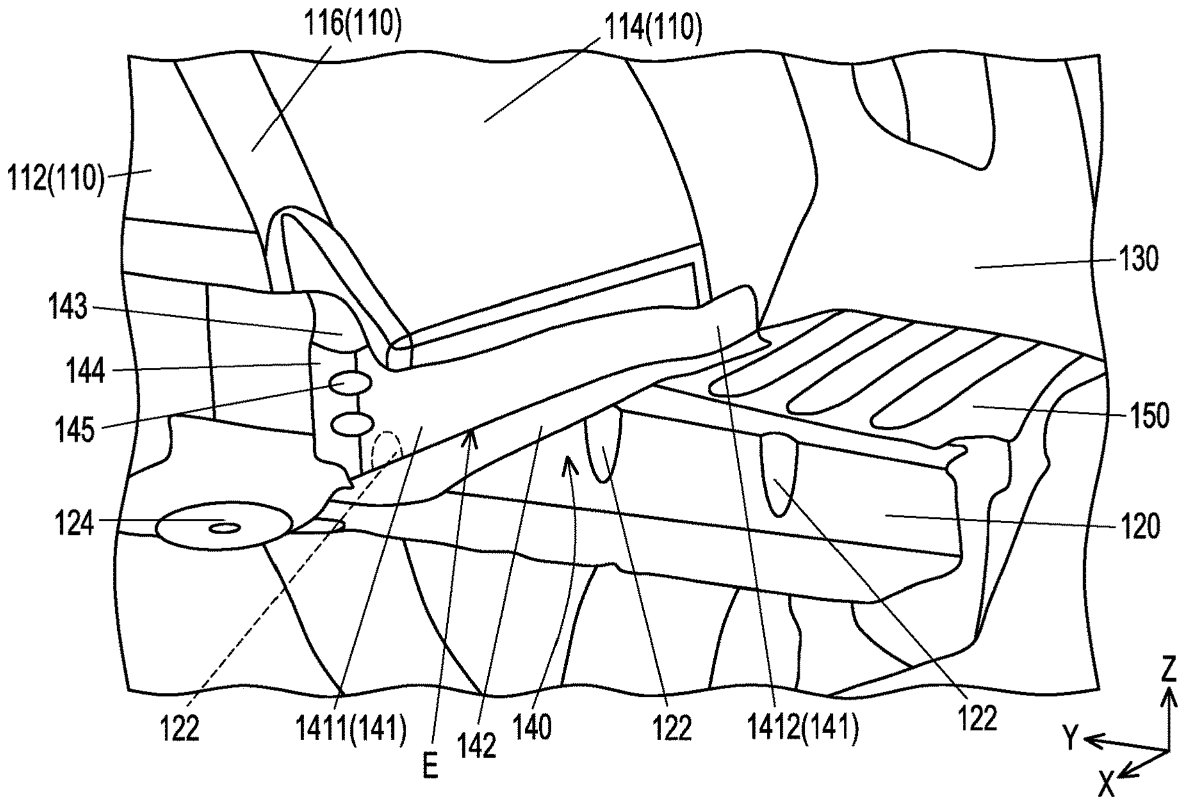
FIG. 2A is a partially enlarged schematic view of the rear structure of vehicle in FIG. 1.
Figure 2B:
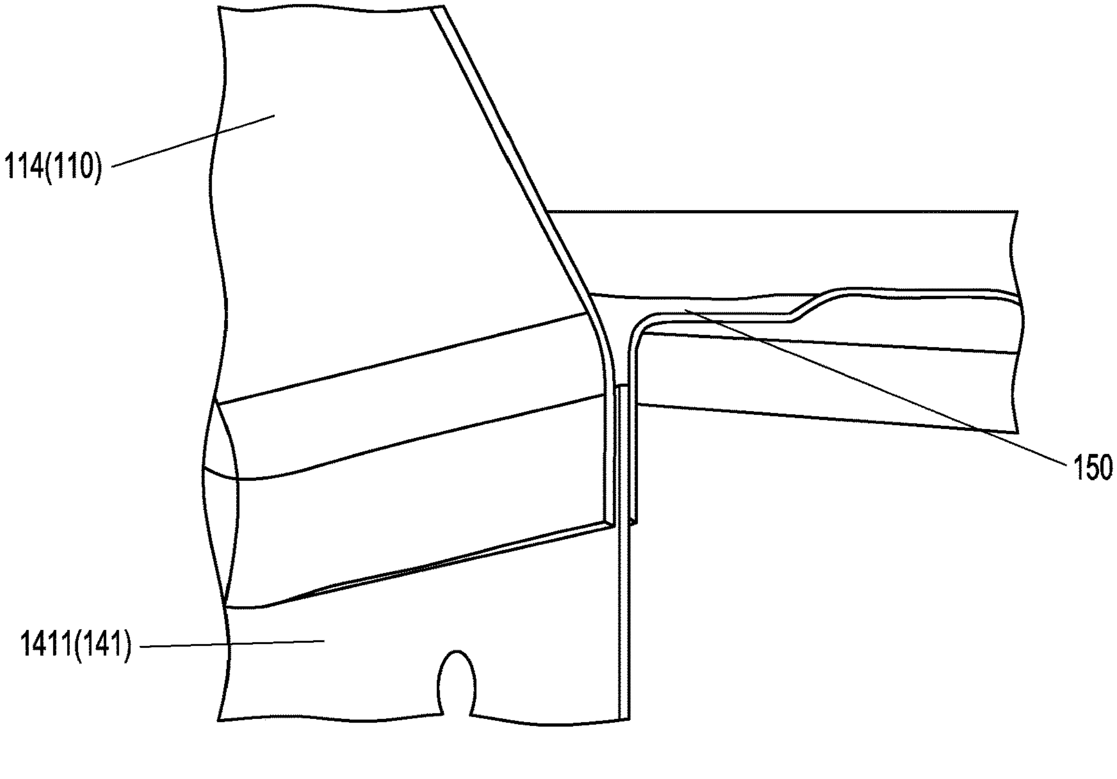
FIG. 2B is a partial cross-sectional view of the rear structure of vehicle in FIG. 2A.
Figure 3:
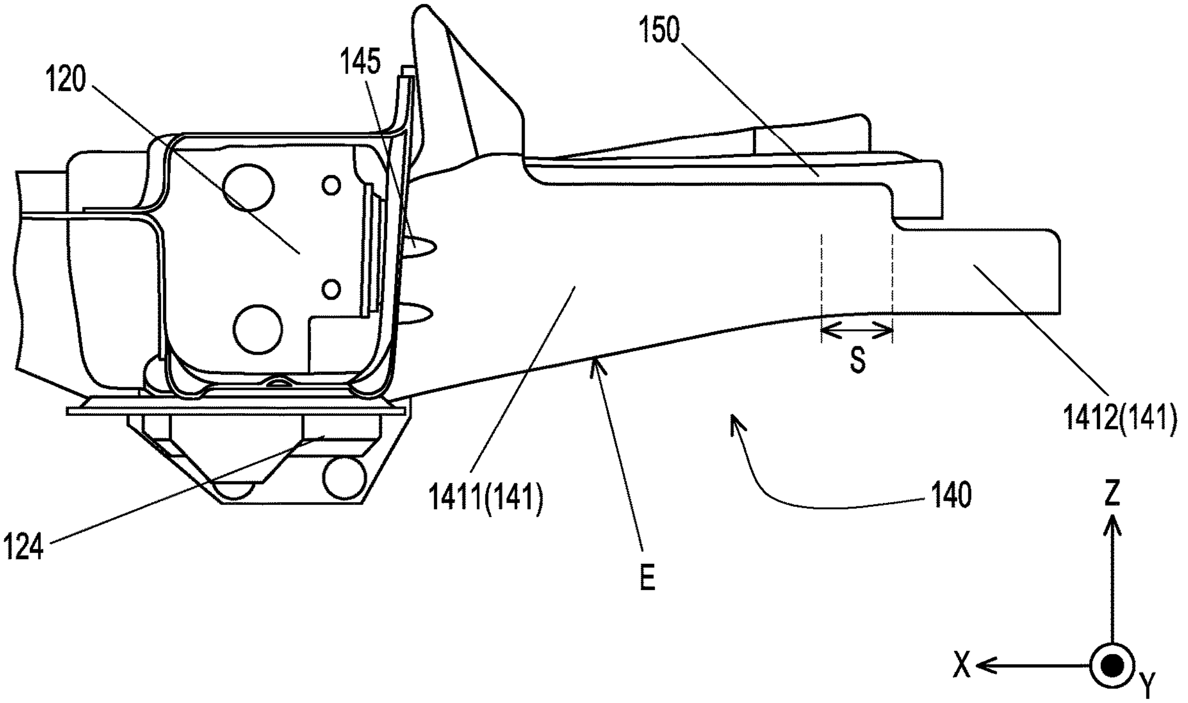
FIG. 3 is a partial front cross-sectional view of the rear structure of vehicle in FIG. 2A.
Figure 4:
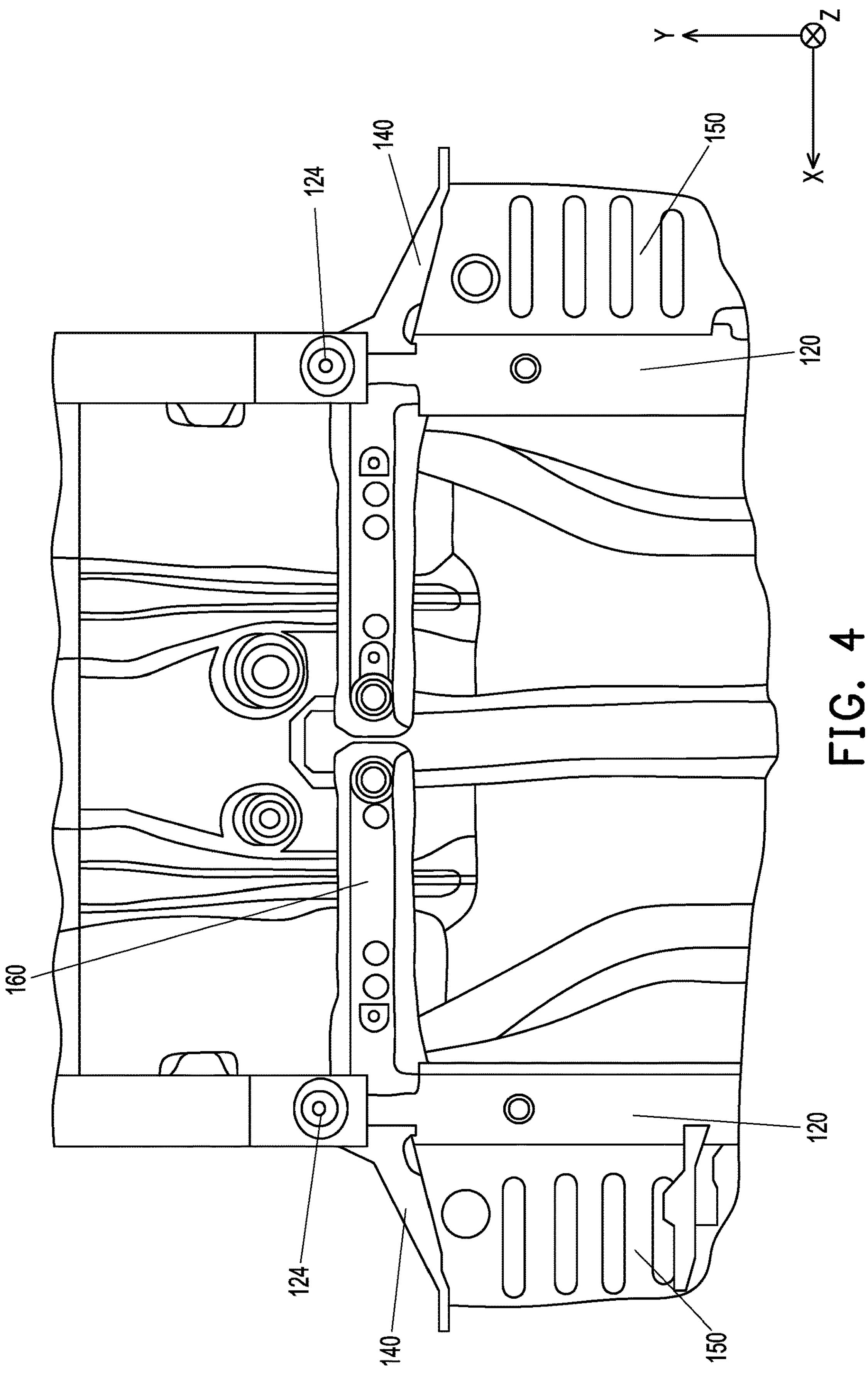
FIG. 4 is a bottom view of the rear structure of vehicle in FIG. 1.

FIG. 1 is a perspective schematic view of the rear structure of vehicle according to one embodiment of the disclosure. FIG. 2A is a partially enlarged schematic view of the rear structure of vehicle in FIG. 1. FIG. 2B is a partial cross-sectional view of the rear structure of vehicle in FIG. 2A. FIG. 3 is a partial front cross-sectional view of the rear structure of vehicle in FIG. 2A. FIG. 4 is a bottom view of the rear structure of vehicle in FIG. 1. In this embodiment, the rear structure of vehicle 100 is, for example, the rear structure of an ordinary passenger vehicle (not shown), but it may also be applied to any other similar device, and the disclosure is not limited thereto. The vehicle-width-direction X, the vehicle front and rear direction Y, and the vehicle up and down direction Z in the accompanying drawings are not used to limit the position relationship of each component in the disclosure. It should also be noted that, unless otherwise specified, the front side and the upper side in the specification below are the directions indicated by the arrows of the vehicle front and rear direction Y and the vehicle up and down direction Z, while the rear side and the lower side in the specification are the opposite of the foregoing directions; the inner side and the outer side in the specification are the relative positions on the vehicle-width-direction X, and the direction indicated by the arrow of the vehicle-width-direction X is not intended to limit the inner side or the outer side. If applicable, the same reference numerals in the drawings and the descriptions indicate the same or similar parts. The rear structure of vehicle 100 of this embodiment is described below with reference to FIGS. 1 to 4.

Referring to FIG. 1 and FIG. 2A, in this embodiment, the rear structure of vehicle 100 includes a rear wheel cover 110, a rear side vehicle frame 120, a rear side inner panel 130, and an outrigger 140. The rear side vehicle frame 120 is provided on a lower side in the vehicle up and down direction Z of the rear wheel cover 110 and extends along the vehicle front and rear direction Y. It should be noted that, although the rear side vehicle frame 120 of this embodiment is provided with a pair (as shown in FIG. 4), since the rear structure of vehicle 100 is a symmetrical structure, in order to simplify the description, a single side is taken as an example below. The rear side inner panel 130 is provided on the outer side in the vehicle-width-direction X of the rear wheel cover 110 and has a portion that covers the rear wheel cover 110 and extends toward the rear side in the vehicle front and rear direction Y. The outrigger 140 extends from the rear side vehicle frame 120 toward the outer side in the vehicle-width-direction X and is joined with a rear side lower end portion of the rear wheel cover 110. Moreover, the outrigger 140 is joined with the rear side inner panel 130 in the vehicle front and rear direction Y. In other words, the rear wheel cover 110, the rear side inner panel 130, and the outrigger 140 are joined with each other, and the joining method is, for example, welding, but it may also be other appropriate joining methods, and the disclosure is not limited thereto.

It may be seen from this that in the rear structure of vehicle 100 of this embodiment, the outrigger 140 and the rear side inner panel 130 are joined in the vehicle front and rear direction Y. Thus, when the rear portion of the vehicle body twists, the lower portion of the rear side inner panel 130 may be suppressed from expanding toward the outer side, thereby suppressing the twisting of the vehicle body. In other words, joining in a direction orthogonal to the expansion direction (i.e., shearing direction) may ensure the joint strength of the rear side inner panel 130 and the outrigger 140, and may also suppress the twisting of the vehicle body by suppressing the separation of the rear side inner panel 130. Accordingly, the rear structure of vehicle 100 of this embodiment is capable of preventing components from being separated due to inertia.

Furthermore, as shown in FIG. 2A, in this embodiment, the outrigger 140 includes a side wall 141, and the side wall 141 is provided on a lower side in the vehicle up and down direction Z of the rear wheel cover 110. The side wall 141 includes a body portion 1411 and an extension portion 1412. The body portion 1411 extends along the vehicle-width-direction X and is joined with the rear wheel cover 110 in the vehicle front and rear direction Y. Specifically, the body portion 1411 is joined with the rear side in the vehicle front and rear direction Y of the rear wheel cover 110. The extension portion 1412 extends from the body portion 1411 toward the outer side in the vehicle-width-direction X, and the extension portion 1412 is joined with the rear side inner panel 130 in the vehicle front and rear direction Y. Specifically, the extension portion 1412 is joined with the front side in the vehicle front and rear direction Y of the rear side inner panel 130. Thus, when the rear portion of the vehicle twists, the outrigger 140 may suppress the rear side inner panel 130 from expanding toward the outer side, thereby suppressing the twisting of the vehicle body and improving the operating safety of the vehicle.

Furthermore, in this embodiment, floor base plate side portions 150 are provided on the rear side in the vehicle front and rear direction Y of the rear wheel cover 110 and on the outer side in the vehicle-width-direction X of the rear side vehicle frame 120. As shown in FIG. 2B, the body portion 1411 of the side wall 141 is clamped and joined by the rear wheel cover 110 and the floor base plate side portions 150 in the vehicle front and rear direction Y. In other words, the rear wheel cover 110, the body portion 1411, and the floor base plate side portions 150 are provided and joined in this order from front to rear in the vehicle front and rear direction Y. The extension portion 1412 extends in the vehicle-width-direction X to the outer side than the floor base plate side portions 150 and is joined with the rear side inner panel 130. The rear wheel cover 110, the outrigger 140, and the floor base plate side portions 150 are joined with each other, and the outrigger 140 is further joined with the rear side inner panel 130 on the outer side in the vehicle-width-direction X, which may further ensure that the twisting of the vehicle body is suppressed, thereby improving vehicle handling and riding comfort.

Moreover, as shown in FIG. 3, in this embodiment, a lower end edge E of the body portion 1411 of the side wall 141 gradually tilts toward an upper side in the vehicle up and down direction Z as extending toward the outer side in the vehicle-width-direction X. In other words, the width of the body portion 1411 in the vehicle up and down direction Z is tapered as extending toward the outer side in the vehicle-width-direction X. A space S is formed between the lower end edge E and the extension portion 1412 in the vehicle-width-direction X. Thus, the load input to the outrigger 140 may be efficiently transferred to the outside of the rear side vehicle frame 120, and the bending point (i.e., the outer side end portion of the lower end edge E in the vehicle-width-direction X) may be provided in the area corresponding to the body portion 1411 (i.e., in a highly rigid area formed by the joining of three components) through providing the space S, thereby suppressing the deformation of the outrigger 140.

Returning to FIG. 2A again, in this embodiment, the outrigger 140 further includes a lower wall 142. The lower wall 142 extends from the lower end edge E of the side wall 141 toward the vehicle front and rear direction Y, and the width of the lower wall 142 in the vehicle front and rear direction X is tapered as extending toward the outer side in the vehicle-width-direction X. Moreover, the rear side vehicle frame 120 includes protruding portions 122. Multiple protruding portions 122 are formed, where a portion (for example, two) is provided at a position further rearward than the side wall 141 of the outrigger 140 in the vehicle front and rear direction Y, and another portion (for example, one) is provided at a position overlapping the lower wall 142 of the outrigger 140 in the vehicle-width-direction X. In other embodiments not shown, only one protruding portion 122 may be provided, and the disclosure is not limited thereto. In this way, the outrigger 140 is formed wider on the inner side in the vehicle-width-direction X and may maintain a certain degree of rigidity, and the outrigger 140 is relatively narrow on the outer side in the vehicle-width-direction X, so that the space for deformation behind the outrigger 140 is sufficient. At the same time, with the support of the rear side inner panel 130, more impact force from a rear side collision may be absorbed.

Furthermore, in this embodiment, the outrigger 140 further includes a connecting portion 143, a flange portion 144, and a guiding ridge 145. The connecting portion 143 is provided on an inner side end portion in the vehicle-width-direction X of the side wall 141 and on the upper side in the vehicle up and down direction Z. The flange portion 144 extends from the inner side end portion in the vehicle-width-direction X of the side wall 141 toward a front side in the vehicle front and rear direction Y and is joined with the rear side vehicle frame 120. The guiding ridge 145 is provided between the flange portion 144 and the side wall 141 and on the lower side in the vehicle up and down direction Z of the connecting portion 143, that is, at the corner of the flange portion 144 and the side wall 141. Specifically, for example, there are multiple guiding ridges 145 in this embodiment, which are provided in series in the vehicle up and down direction Z. However, only one guidance ridge 145 may be provided, and the disclosure is not limited thereto. Thus, the outrigger 140 may transfer the load to the rear side vehicle frame 120 more efficiently, and may also increase the joint strength with the rear side vehicle frame 120, thereby suppressing the twisting of the vehicle body.

In addition, in this embodiment, the rear wheel cover 110 includes an inner wall 112, a rear wall 114, and a ridge line portion 116. The inner wall 112 is provided on an inner side in the vehicle-width-direction X. The rear wall 114 is provided on a rear side in the vehicle front and rear direction Y of the inner wall 112. The ridge line portion 116 is provided between the inner wall 112 and the rear wall 114. The ridge line portion 116 extends tiltedly along the lower side in the vehicle up and down direction Z and the rear side in the vehicle front and rear direction Y to the connecting portion 143 of the outrigger 140 and is joined. Thus, the load input to the outrigger 140 may be efficiently transferred to the ridge line portion 116 of the rear wheel cover 110, thereby improving the rigidity of the outrigger 140.

Referring to FIG. 4, in this embodiment, the rear structure of vehicle 100 further includes a floor beam member 160. The floor beam member 160 is provided between a pair of the rear side vehicle frames 120 and extends along the vehicle-width-direction X. The lower surface of the rear side vehicle frame 120 is provided with a sub vehicle frame fixing portion 124 for fixing the sub vehicle frame (not shown). The outrigger 140 is provided in parallel with the floor beam member 160 in the vehicle-width-direction X, and the outrigger 140 is provided at a position further rearward than the sub vehicle frame fixing portion 124 in the vehicle front and rear direction Y. With such a configuration, the load input to the outrigger 140 may be transferred to the floor beam member 160 to improve the rigidity of the outrigger 140. Moreover, since the load input from the sub vehicle frame may be transferred to the outrigger 140, the outrigger 140 may play a supporting role to prevent the sub vehicle frame and the rear side vehicle frame 120 from falling down. The floor beam member 160 is, for example, two beam members respectively extending from the center side to the outer side in the vehicle-width-direction X between a pair of the rear side vehicle frames 120. However, the floor beam member 160 may also be a beam member extended between a pair of rear side vehicle frames 120, and disclosure is not limited thereto.

To sum up, in the rear structure of vehicle of the disclosure, the outrigger and the rear side inner panel are joined in the vehicle front and rear direction. Thus, when the rear portion of the vehicle body twists, the lower portion of the rear side inner panel may be suppressed from expanding toward the outer side, thereby suppressing the twisting of the vehicle body. In other words, joining in a direction orthogonal to the expansion direction (i.e., shearing direction) may ensure the joint strength of the rear side inner panel and the outrigger, and may also suppress the twisting of the vehicle body by suppressing the separation of the rear side inner panel. Moreover, the outrigger includes the side wall, and the side wall includes the body portion and the extension portion. The body portion is joined with the rear wheel cover in the vehicle front and rear direction, and the extension portion is joined with the rear side inner panel in the vehicle front and rear direction on the outer side of the body portion. Thus, when the rear portion of the vehicle twists, the outrigger may suppress the rear side inner panel from expanding toward the outer side, thereby suppressing the twisting of the vehicle body and improving the operating safety of the vehicle. Accordingly, the rear structure of vehicle of the disclosure is capable of preventing components from being separated due to inertia.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A rear structure of vehicle, comprising:

a rear wheel cover;

a rear side vehicle frame, provided on a lower side in a vehicle up and down direction of the rear wheel cover;

a rear side inner panel, provided on an outer side in a vehicle-width-direction of the rear wheel cover; and an outrigger, extending from the rear side vehicle frame toward the outer side in the vehicle-width-direction and joining with a rear side lower end portion of the rear wheel cover, wherein the outrigger is joined with the rear side inner panel in a vehicle front and rear direction, the outrigger comprises a side wall, and the side wall is provided on a lower side in the vehicle up and down direction of the rear wheel cover, the side wall comprises a body portion and an extension portion, the body portion is joined with the rear wheel cover, the extension portion extends from the body portion toward the outer side in the vehicle-width-direction, and the extension portion is joined with the rear side inner panel in the vehicle front and rear direction.

2. The rear structure of vehicle according to claim 1, wherein floor base plate side portions are provided on a rear side in the vehicle front and rear direction of the rear wheel cover and on the outer side in the vehicle-width-direction of the rear side vehicle frame, the body portion of the side wall is clamped and joined by the rear wheel cover and the floor base plate side portions, and the extension portion extends in the vehicle-width-direction to the outer side than the floor base plate side portions and is joined with the rear side inner panel.

3. The rear structure of vehicle according to claim 2, wherein a lower end edge of the body portion of the side wall gradually tilts toward an upper side in the vehicle up and down direction as extending toward the outer side in the vehicle-width-direction, and a space is formed between the lower end edge and the extension portion in the vehicle-width-direction.

4. The rear structure of vehicle according to claim 1, wherein the outrigger further comprises a lower wall, and the lower wall extends from a lower end edge of the side wall toward the vehicle front and rear direction, and a width of the lower wall in the vehicle front and rear direction is tapered as extending toward the outer side in the vehicle-width-direction.

5. The rear structure of vehicle according to claim 4, wherein the rear side vehicle frame comprises protruding portions, and a portion of the protruding portions are provided at a position further rearward than the side wall of the outrigger in the vehicle front and rear direction, and another portion is provided at a position overlapping the lower wall of the outrigger in the vehicle-width-direction.

6. The rear structure of vehicle according to claim 1, wherein the rear wheel cover comprises:

an inner wall, provided on an inner side in the vehicle-width-direction;

a rear wall, provided on a rear side in the vehicle front and rear direction; and a ridge line portion, provided between the inner wall and the rear wall, wherein the outrigger further comprises a connecting portion, and the connecting portion is provided on an inner side end portion in the vehicle-width-direction of the side wall and joined with the ridge line portion.

7. The rear structure of vehicle according to claim 1, wherein the outrigger further comprises:

a flange portion, extending from an inner side end portion in the vehicle-width-direction of the side wall toward a front side in the vehicle front and rear direction, wherein the flange portion is joined with the rear side vehicle frame; and a guiding ridge, provided between the flange portion and the side wall.

8. A rear structure of vehicle comprising:

a rear wheel cover;

a rear side vehicle frame, provided on a lower side in a vehicle up and down direction of the rear wheel cover;

a rear side inner panel, provided on an outer side in a vehicle-width-direction of the rear wheel cover;

an outrigger, extending from the rear side vehicle frame toward the outer side in the vehicle-width-direction and joining with a rear side lower end portion of the rear wheel cover, wherein the outrigger is joined with the rear side inner panel in a vehicle front and rear direction; and a floor beam member, provided between a pair of the rear side vehicle frames, wherein a lower surface of the rear side vehicle frame is provided with a sub vehicle frame fixing portion, the outrigger is provided in parallel with the floor beam member in the vehicle-width-direction, and the outrigger is provided at a position further rearward than the sub vehicle frame fixing portion in the vehicle front and rear direction.

* * * * *